3,239,493
POLY(ACRYLIC METHACRYLIC ANHYDRIDES AND ACIDS)
Jesse C. H. Hwa, Levittown, Pa., assignor to Rohm & Haas Company, Philadelphia, Pa., a corporation of Delaware
No Drawing. Filed May 15, 1961, Ser. No. 109,830
10 Claims. (Cl. 260—80)

This application is a continuation-in-part of Serial Number 845,323, filed October 9, 1959, and now abandoned.

This invention relates to poly(acrylic methacrylic anhydride) and poly(acrylic methacrylic acid) as new compositions of matter.

Acrylic anhydride and methacrylic anhydride have been known. Poly(acrylic anhydride) and poly(methacrylic anhydride) have also been known. Mixed acrylic methacrylic anhydride has been proposed but not made; the polymer and acid derived therefrom have, however, not previously been known and are the subject of this invention.

Preparation of the mixed acrylic methacrylic anhydride, which may be represented structurally as follows,

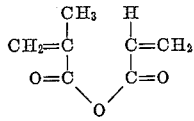

Formula I.—Acrylic methacrylic anhydride may be accomplished by reacting an appropriate acyl halide with either sodium or potassium acrylate or methacrylate in, for example, a benzene solution containing an inhibitor. Specifically, the halide could typically be methacrylyl chloride, in which case the other reactant would be either sodium or potassium acrylate. Or, if acrylyl chloride were the halide, it would be reacted with sodium or potassium methacrylate. Halides other than the chlorides can be used as well.

The liquid acrylic methacrylic anhydride may readily be polymerized without a solvent (as in bulk polymerization), or with a solvent. When a solvent is employed it may be of two kinds, one a diluent that will dissolve the polymer which is formed (e.g., dimethylformamide, dimethyl sulfoxide, etc.), and the other a diluent which will coagulate the polymer that is formed (e.g., benzene, acetone, dioxane, etc.). In the latter case, the polymer which is precipitated is filtered, washed with benzene or the like, and dried to form a white powder. In the former case, a viscous solution is formed; it can be used in that form, coagulated by adding the solution to a non-solvent such as acetone, or evaporated to a dry polymer.

The polymerization may be carried out at room temperature up to the boiling point of the liquid, although 50°–100° C. is normally preferred. The reaction may be initiated or accelerated, in conventional ways, by the use of heat, ultraviolet light, and free-radical catalysts. Typical of the catalysts which are suitable are α,α'-bis-azoisobutyronitrile, methyl azoisobutyrate, benzoyl peroxide, acetyl peroxide, lauroyl peroxide, tert.-butyl hydroperoxide, di-tert.-butyl peroxide, tert.-butyl perbenzoate, stearoyl peroxide, ascaridol, and cumene hydroperoxide. The catalysts are used in amounts from 0.01 to 5%, and preferably from 0.02 to 2%, based on the weight of the polymerizable compounds.

The polymer which is obtained may be graphically represented as follows:

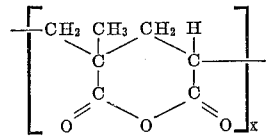

Formula II.—Poly(acrylic methacrylic anhydride)

in which x is an integer from about 7 to about 14,000.

Poly(acrylic methacrylic acid) may readily be prepared by hydrolysis of poly(acrylic methacrylic anhdride). This can be done quite simply by application of water and heat. The poly acid, which is a 1:1 copolymer of acrylic and methacrylic acids, is of special interest. It may be graphically represented as follows:

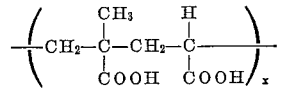

Formula III.—Poly(acrylic methacrylic acid)

in which x has the same value as above.

One unique feature of poly(acrylic methacrylic acid) is the way the acrylic acid and methacrylic acid units are arranged in the macromolecule. This arrangement is different from that which is obtained if equal number of units of acrylic acid and methacrylic acid are copolymerized by conventional methods.

To illustrate these points, if equal number of M (methacrylic acid) units and A (acrylic acid) units are copolymerized by, for example, free-radical catalysts, at best a random copolymer would be obtained. The following graphic illustration suggest the "randomness" of the arrangement of the M and A units:

—MMAMAAAAMMAMMMAA—

By contrast, when the monomeric starting material is acrylic methacrylic anhydride, in accordance with the present invention, a cyclopolymer, poly(acrylic methacrylic anhydride), is formed; and this cyclopolymer may have one of the three following structural arrangements:

(a) $-\widehat{MA}\widehat{MA}\widehat{MA}\widehat{MA}\widehat{MA}-$ (b) $-\widehat{MA}\widehat{AMMA}\widehat{AMMA}-$ (c) $-\widehat{MA}\widehat{AM}\widehat{AMMA}\widehat{AM}-$ where

is an abbreviation for the structural unit

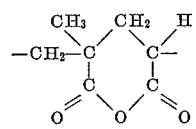

Upon hydrolysis, there is obtained poly(acrylic methacrylic acid), the structural arrangement of which may be one of three types corresponding to the parent poly(anhydride):

(a')—MAMAMAMAMA—

(b')—MAAMMAAMMA—

(c')—MAAMAMMAAM—

One may observe that the M and A units in (a'), (b'), and (c') occur, respectively, in alternation, by pairs, and at random, but never with more than two identical units adjacent to each other.

Because of this difference in structural configuration, poly(acrylic methacrylic acid) is found to be superior to a random copolymer of acrylic acid and methacrylic acid.

Examples 1 to 7, which follow, set forth various typical modes of preparation for the novel materials described above.

*Example 1*

In a suitable reaction flask equipped with a mechanical stirrer, reflux condenser, and dropping funnel are placed 108 parts of dry sodium methacrylate, 0.6 part of methylene anthrone, and 400 parts of benzene. While the contents are stirred, 115 parts of acrylyl chloride is added dropwise in a period of 40 minutes, at which time the temperature of the mixture has risen from 25° to 55° C. The contents are then refluxed by heating for 3 hours and allowed to stand at room temperature overnight. The mixture is then stripped of the benzene by distillation, and the remainder is further heated under vacuum. There is obtained 129 parts of a colorless liquid, acrylic methacrylic anhydride, which boils at 64° C. at 4 mm. pressure and has a refractive index, $n_D^{20}$ of 1.4516. The yield is 92.3%.

*Analysis.*—Calculated for acrylic methacrylic anhydride, $C_7H_8O_3$: C, 60.0; H, 5.71. Found: C, 60.4; H, 5.57.

*Example 2*

In a similar manner as in Example 1, acrylic methacrylic anhydride is obtained from sodium acrylate and methacrylyl chloride.

*Example 3*

(A) A mixture of 20 parts of acrylic methacrylic anhydride, 160 parts of benzene, and 0.1 part of azobisisobutyronitrile is boiled for 18 hours. The precipitated material, removed by filtration, is washed with three 100-part portions of benzene. The washed polymer is then dried in an oven. The yield of poly(acrylic methacrylic anhydride) is 19.8 parts, or 99% of the theory. The weight average molecular weight of this polymer is about 40,000, which corresponds to 280 recurring units, (i.e. $x$ is equal to 280 in Formula II).

(B) Similarly, acrylic methacrylic anhydride may be polymerized by heating 100 parts of the monomer with 600 parts of acetone and 2 parts of benzoyl peroxide at 60° for 12 hours. The precipitated material is filtered, washed, and dried. Seventy-two parts of poly(acrylic methacrylic anhydride) is obtained. The weight average molecular weight and value for $x$ are as given in Example 3(A).

The polymer from (A) or (B) is insoluble in common organic solvents such as benzene, alcohol, acetone, ether, octane, acetonitrile, butyl cellosolve, dioxane, etc.; it is soluble in dimethyl formamide and dimethyl sulfoxide.

*Example 4*

A mixture of 10 parts of acrylic methacrylic anhydride, 40 parts of toluene, and a trace of benzoin is frozen in an ampule by a bath of liquid nitrogen. The ampule is sealed under vacuum and then irradiated by ultraviolet light from a Sylvania black light tube for 7 hours at −50° C. The contents are removed and mixed with an excess of hexane. The precipitated polymer is filtered off and dried in an oven. The yield is 4.2 parts of poly(methacrylic acrylic anhydride). The weight average molecular weight of this polymer is about 200,000, which corresponds to 1400 recurring units (i.e. $x$ is equal to 1400 in Formula II).

*Example 5*

(A) Acrylic methacrylic anhydride can be bulk polymerized in the presence of 0.02% of benzoyl peroxide in a glass mold at 65° to 110° C. for 40 hours to give a clear, hard polymer, poly(methacrylic acrylic anhydride), which has good adhesion to glass. The polymer shows no softening when heated to 100° to 110° C. A laminate of glass-polymer-glass has good mechanical strength, heat stability, and clarity. The weight average molecular weight of this polymer is about 850,000, which corresponds to 6,000 recurring units (i.e. $x$ is equal to 6,000 in Formula II).

(B) Alternatively, a mixture of 100 parts of acrylic methacrylic anhydride, 200 parts of dimethyl sulfoxide, and 1 part of α,α'-bis-azoisobutyronitrile is heated at 100° for 10 hours. Another part of the catalyst is added and the heating is continued for 5 more hours. The viscous solution is cooled to room temperature and added with stirring to 1500 parts of isopropanol. The coagulated material is washed with fresh isopropanol and then dried. The yield is 45 parts. The weight average molecular weight of this polymer is about 70,000, which corresponds to 490 recurring units (i.e. $x$ is equal to 490 in Formula II).

*Example 6*

(A) A mixture of 10 parts of poly(acrylic methacrylic anhydride) and 100 parts of water is boiled for 2 hours. The solution is then treated with a commercial adsorbent and then freeze-dried. Seven and four-tenths parts of poly(acrylic methacrylic acid) is obtained. The polymer is soluble in water and can be neutralized with alkali solutions.

(B) Alternatively, a mixture of 10 parts of poly(acrylic methacrylic anhydride) and an equivalent amount of 1 N sodium hydroxide is stirred at room temperature overnight. The sodium salt of poly(acrylic methacrylic acid) is formed in quantitative yield. The free poly acid may be isolated by ion exchange and evaporization.

*Example 7*

Powdery poly(acrylic methacrylic anhydride) dissolves in a few minutes in an equivalent amount of aqueous alkali to give a clear solution of alkali salt of poly(acrylic methacrylic acid).

The number of recurring units in the polymers obtained in Examples 6 and 7 is about the same in each instance as that of the corresponding parent polymers shown in Examples 3–4–5.

It should be understood that the figures given in the examples for recurring units and molecular weights represent averages based upon a mixture of polymers, each of which individually has a molecular weight running from about 1000 (which corresponds to about 7 units, i.e. the value for $x$ in Formula II) to 2,000,000 (which corresponds to about 14,000 recurring units, i.e. the value for $x$ in Formula II).

The materials described above have a number of interesting properties and utilities. For example, poly(acrylic methacrylic anhydride), like poly(styrene) and poly(methyl methacrylate), is a thermoplastic and has similar properties and utilities in addition to some unique and superior characteristics which will be described below.

Poly(acrylic methacrylic anhydride) can be molded into a sheet or article at elevated temperatures by common injection molding techniques. The sheet is clear and has good optical clarity. The sheet has these special qualities: It is harder and more heat durable than poly(styrene) for example; and at 130°–140° C., a temperature range where poly(styrene) would soften to flowable material, poly(acrylic methacrylic anhydride) still holds its physical form and clarity. For these reasons, poly(acrylic methacrylic anhydride) is particularly useful as improved transparent domes for aircrafts.

Because of its highly polar chemical nature, poly(acrylic methacrylic anhydride) is resistant to common organic industrial solvents such as kerosene, benzene, cleaning fluids, acetone, lacquer thinners, as well as common laboratory solvents such as nitrobenzene, dioxane, ether, chloroform, etc. In this respect, articles made with poly(acrylic methacrylic anhydride) have enhanced durability toward common organic solvents in comparison with prior art plastics.

Poly(acrylic methacrylic anhydride), moreover, can be dissolved by using more powerful polar solvents, such as dimethylformamide and dimethyl sulfoxide. For example, 30 parts of powdery poly(acrylic methacrylic anhydride), 70 parts of dimethyl sulfoxide are stirred and heated at 120° C. for one-half hour. The resulting solution is clear and viscous. The viscosity has a rating of V at 25° C. by the Gardner-Holdt scale. The viscous solution can be applied onto a variety of metallic articles by brushing, dipping, etc., and then dried by heating. The resulting coating is a clear, hard plastic with solvent-resistant characteristics as noted above.

Poly(acrylic methacrylic anhydride) has a special quality, namely, its ability to adhere to glass. A glass-poly(acrylic methacrylic anhydride)-glass laminate made by polymerizing acrylic methacrylic anhydride between two glass plates has improved structural strength without sacrifice of optical clarity. Poly(acrylic methacrylic anhydride) is therefore useful as a binder in special glassy articles such as television viewing tubes.

Other properties and utilities for poly(acrylic methacrylic anhydride), and likewise for the acid, exist. The acid, for example, is useful in forming a useful warp size for nylon. Accordingly, this invention is not to be limited by the specific illustrations, but only by the limits of the following claims.

I claim:
1. Poly(acrylic methacrylic anhydride), a new composition of matter in which the fundamental recurring unit has the formula

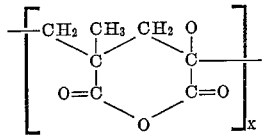

in which $x$ is an integer from about 7 to about 14,000, and which upon hydrolysis yields an equimolar copolymer of methacrylic and acrylic acids of such a structure that the methacrylic and acrylic acid units occur, respectively, in alternation, by pairs, but never with more than two identical units adjacent to each other.

2. The composition of claim 1 in which $x$ has a value of about 280.
3. The composition of claim 1 in which $x$ has a value of 490.
4. The composition of claim 1 in which $x$ has a value of 1,400.
5. The composition of claim 1 in which $x$ has a value of 6,000.
6. Poly(acrylic methacrylic acid), a new composition of matter in which the fundamental recurring unit has the formula

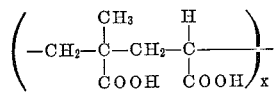

in which $x$ is an integer from about 7 to about 14,000, and in which the methacrylic and acrylic acid units occur, respectively, in alternation, by pairs, but never with more than two identical units adjacent to each other.

7. The composition of claim 6 in which $x$ has a value of about 280.
8. The composition of claim 6 in which $x$ has a value of about 490.
9. The composition of claim 6 in which $x$ has a value of about 1,400.
10. The composition of claim 6 in which $x$ has a value of about 6,000.

References Cited by the Examiner
UNITED STATES PATENTS

| | | | |
|---|---|---|---|
| 2,565,147 | 8/1951 | Pfluger | 260—78.5 |
| 3,005,785 | 10/1961 | Jones et al. | 260—80 |

FOREIGN PATENTS

| | | |
|---|---|---|
| 533,497 | 2/1941 | Great Britain. |
| 563,942 | 9/1957 | Italy. |
| 579,788 | 7/1958 | Italy. |

JOSEPH L. SCHOFER, *Primary Examiner.*
H. BURSTEIN, DONALD CZAJA, LEON BERCOVITZ, *Examiners.*